2 Sheets—Sheet 1.

F. F. LANDIS.

CENTRIFUGAL GRAIN SEPARATOR.

No. 11,631. Reissued Oct. 5, 1897.

Witnesses
Franck L. Ourand
D. H. Naylor

Inventor
Frank F. Landis
per E. W. Bradford
Attorney

2 Sheets—Sheet 2.

F. F. LANDIS.

CENTRIFUGAL GRAIN SEPARATOR.

No. 11,631. Reissued Oct. 5, 1897.

Witnesses
Franck L. Ourand
D. H. Hayler

Inventor:
Frank F. Landis.
per E. W. Bradford
Attorney

UNITED STATES PATENT OFFICE.

FRANK F. LANDIS, OF WAYNESBOROUGH, PENNSYLVANIA.

CENTRIFUGAL GRAIN-SEPARATOR.

SPECIFICATION forming part of Reissued Letters Patent No. 11,631, dated October 5, 1897

Original No. 551,494, dated December 17, 1895. Application for reissue filed April 20, 1897. Serial No. 633,062.

*To all whom it may concern:*

Be it known that I, FRANK F. LANDIS, a citizen of the United States, residing at Waynesborough, in the county of Franklin and State of Pennsylvania, have invented certain new and useful Improvements in Centrifugal Grain-Separators; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to centrifugal grain-separators; and it consists in the novel construction and combination of the parts hereinafter fully described and claimed.

Figure 1:
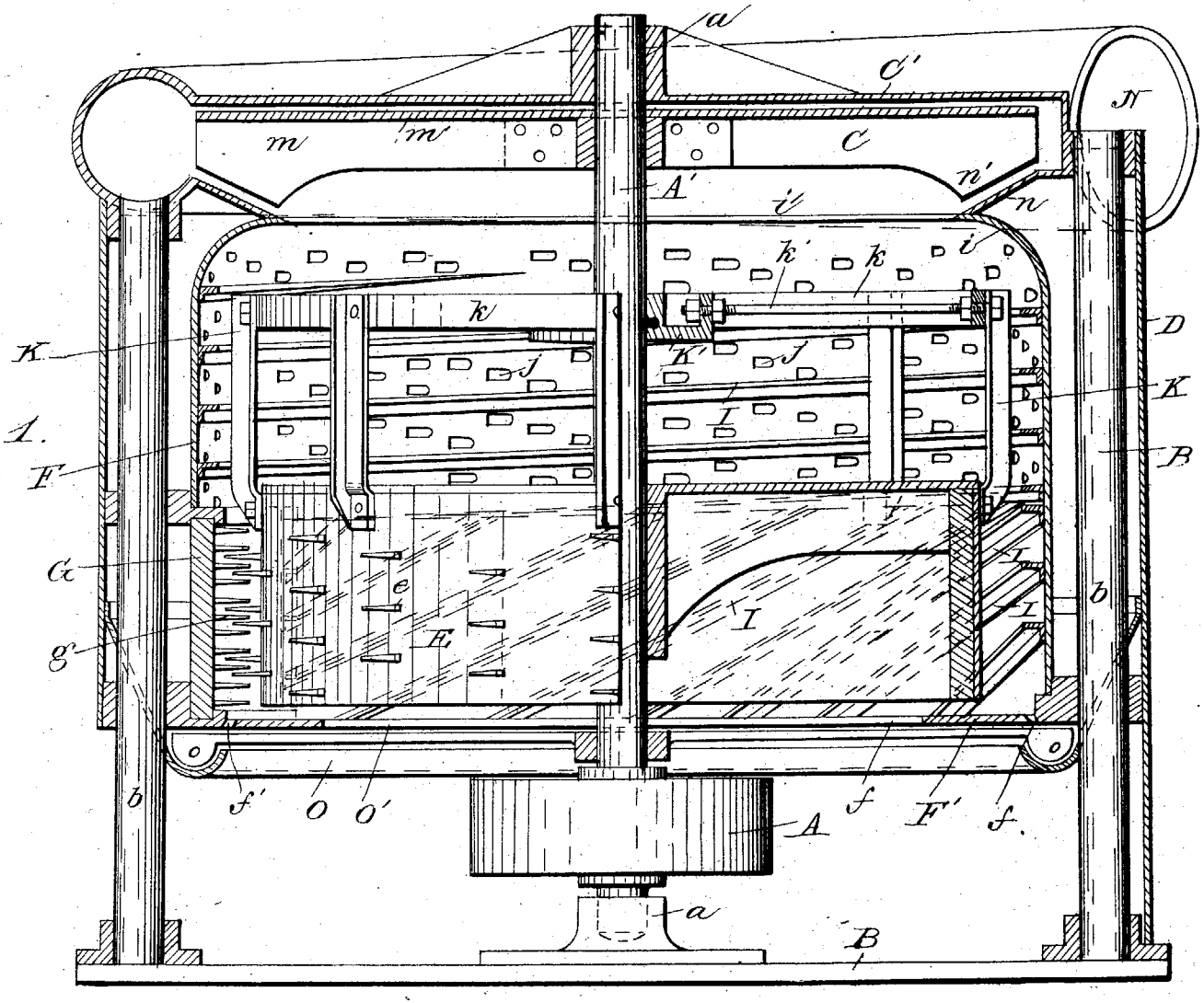
Figure 3:
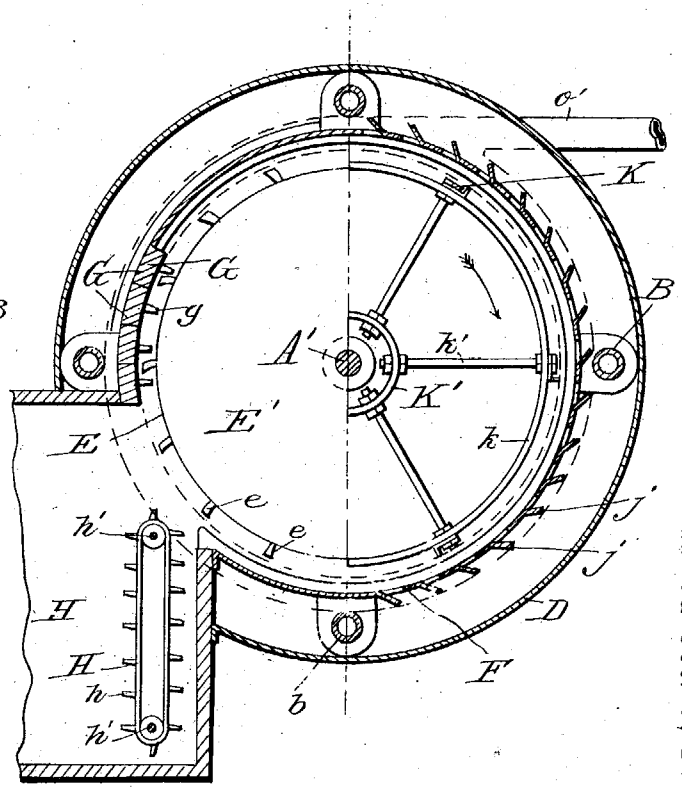
Figure 2:
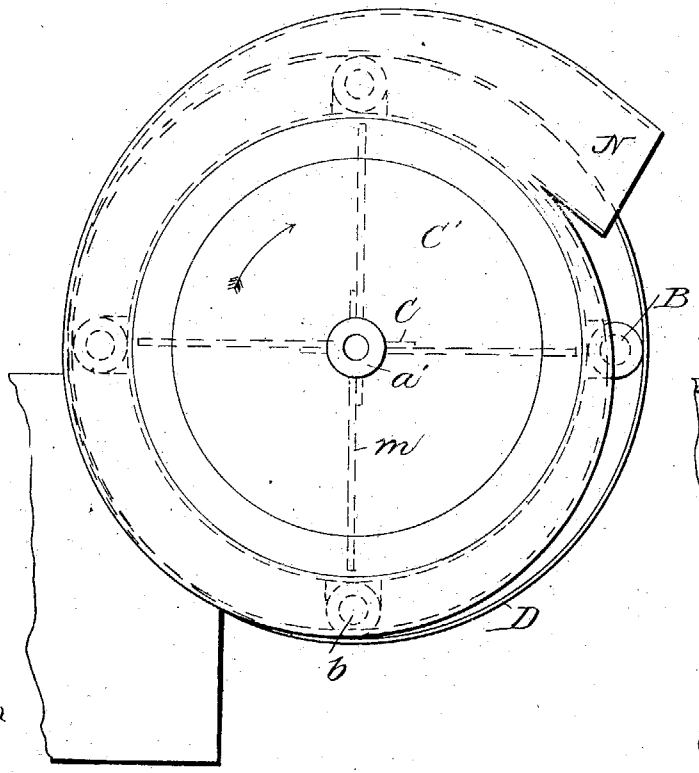

In the drawings, Figure 1 is a vertical section through the machine. Fig. 2 is a top or plan view. Fig. 3 is a sectional plan view on the dotted lines 3 3 in Fig. 1.

A is the driving-pulley of the machine, journaled in the step *a* and in the bearing *a'*.

B is the frame of the machine, which is preferably provided with tubular uprights *b*, secured to the base B', which also supports the step *a*. The upper part of the frame consists of the casing C' of the discharger C, which will be more fully described hereinafter. The bearing *a'* is formed integral with or is otherwise secured to the casing C'. The outer casing D of the machine is cylindrical and may be of sheet metal. This casing D is secured to the uprights *b*.

E is a threshing-cylinder secured upon the vertical shaft A' and provided with teeth *e*. The upper end of the cylinder E is provided with a plate E', but otherwise the cylinder may be of any approved construction, excepting that it is much larger in diameter than the threshing-cylinders ordinarily used in threshing-machines.

F is a separating-chamber, cylindrical in form and encircling the threshing-cylinder. The lower end of this chamber is provided with a head F', having a central opening *f*, smaller in diameter than the cylinder, and holes *f'* near the periphery. Said head serves as a floor to support the straw as it is fed into the machine, and the holes *f'* permit the kernels of grain to drop through.

G is a concave of approved construction, provided with teeth *g* and let into the side of the chamber F.

H is a table or hopper for receiving the unthreshed grain. This table is about level with the lower end of the threshing-cylinder and a little above the head F' and is arranged in front of the concave.

H' is a feeding device consisting of an endless conveyer provided with horizontally-projecting teeth *h*. The conveyer is arranged at or substantially at a tangent to the threshing-cylinder and is driven by vertical shafts and driving-wheels *h'*. The power for driving the feeding device may be obtained from the shaft A' and transmitted to the feeding device therefrom by any approved driving mechanism, (not shown in the drawings,) or the feeding device may be driven separately, or it may be dispensed with altogether, if desired.

I are spirally-arranged ribs or projections secured to the periphery of the chamber F, around the threshing-cylinder, and having considerable pitch or inclination in an upward direction.

I' are spirally-arranged ribs or projections secured to the periphery of the chamber F, above the threshing-cylinder, and having a less pitch or inclination than the ribs I. The chamber is provided at its upper end with an inwardly-curved portion *i* and a central outlet-opening *i'*, which is preferably smaller in diameter than the threshing-cylinder. Passages or holes *j* are formed in the periphery of the chamber F, between the ribs I', and are provided with inclined outwardly-projecting lips *j'*.

K are bars secured to the threshing-cylinder and projecting upwardly in the chamber F in close proximity to the ribs I'. The upper ends of the bars K are secured to a spider or ring *k*, which is carried by arms *k'*, secured to the hub K' on the shaft A'.

The discharger C is provided with radial arms *m*, and its upper side is closed by a disk *m'*. The discharger is secured on the shaft A'. The discharger-casing C' is provided with a conical throat-piece *n*, which fits close onto the top of the chamber F, and the discharger-arms preferably have projections *n'* on their lower sides which project within the said throat-piece. The casing C′ has its periphery formed of a volute curve, and its cross-section increases in area and is greatest where it joins onto the straw-delivery pipe N.

O is a circular trough secured to the casing D and arranged below the holes $f'$ in the head F′ of the separating-chamber.

O′ are arms secured to the shaft A′ and provided with ends $o$, which revolve in the bottom portion of the trough O, which communicates with a grain-delivery pipe $o'$.

The operation of the machine is as follows: The unthreshed grain is laid upon the table and is pressed against the feeding device with the heads pointing toward the concave. The motion of the feeding device and the threshing-cylinder feeds the grain between the cylinder and concave, where the grains are threshed out and most of them fall on the head F′. The grains pass through the holes $f'$ and are discharged up the pipe $o'$ by the arms O′. The straw is guided into the upper part of the chamber F by the ribs I and is whirled around therein by the bars K. The grains are driven out of the straw by centrifugal force and pass through the passages $j$, falling into the trough O. Any grains which fall on the plate E′ of the threshing-cylinder are driven off it by centrifugal force and also fall into the trough O. The straw is guided upwardly in the upper part of the chamber F by the ribs I′, and is deflected at the top of the chamber by its curved portion $i$, so that it is brought into a very loose condition before it passes into the discharger-casing. The discharger draws a current of air through the machine and through the passages $j$ and assists the straw in passing upwardly through the chamber F. The discharger draws the straw through the opening $i'$, and its arms fling the straw against the conical throat-piece $n$, in which it is engaged by the projections $n'$ and whirled around. The straw slides freely up the conical throat-piece and does not catch upon and accumulate around the opening $i'$. The discharger draws all the straw and chaff out of the chamber F and forces them up the straw-delivery pipe. By this arrangement the threshing and separating is all done in a very small space, and a compact inexpensive machine is produced. The cylinder and separating mechanism being vertically arranged, all the separating effect of the centrifugal force is utilized, as the grain is thereby forced through the casing and outside the path of the straw on all sides.

I do not confine myself to the use of the threshing mechanism hereinbefore described, as other approved means for threshing the grain before it passes into the separating-chamber may be used.

What I claim is—

1. The combination, with a vertical shaft, and a toothed threshing-cylinder secured thereon; of a chamber encircling the said cylinder and provided with spiral ribs on its periphery, and a concave arranged at one part of the periphery of the said chamber and provided with projecting teeth arranged to pass between the teeth of the said cylinder, substantially as set forth.

2. The combination, with a vertical shaft, and a threshing-cylinder secured thereon; of a chamber encircling the said cylinder and provided with spiral ribs on its periphery, a concave arranged at one part of the periphery of the said chamber, a circular trough provided with a delivery-pipe and arranged under the said chamber, and arms secured on the said shaft and provided with ends revolving in said trough and operating to force the grains up the said pipe, substantially as set forth.

3. The combination, with a vertical shaft, and a threshing-cylinder secured thereon; of a chamber encircling the said cylinder, a concave at one part of the periphery of the said chamber, a grain-table at the bottom of the said chamber, and a mechanical grain-feeding device arranged crosswise of the said table, substantially as set forth.

4. The combination, with a threshing-cylinder, and bars projecting longitudinally beyond one end of the cylinder; of a separating-chamber provided with spiral ribs on and passages in its periphery, and encircling the said cylinder and arms, substantially as set forth.

5. The combination, with a threshing-cylinder, and bars projecting from one end of the cylinder; of a separating-chamber provided with spiral ribs I and I′ encircling the said cylinder and bars respectively, the ribs I having a greater inclination than the ribs I′, substantially as set forth.

6. The combination, with a threshing-cylinder, and bars projecting longitudinally beyond one end of the cylinder; of a separating-chamber provided with passages in its periphery and encircling the said cylinder and bars, and means for moving the straw in the said chamber in a direction parallel with the axis of the cylinder, substantially as set forth.

7. The combination, with a separating-chamber having continuous and spirally-arranged ribs on its periphery and passages between the said ribs, of a central shaft, and bars supported by the said shaft and operating to whirl around the straw in the said chamber, substantially as set forth.

8. The combination, with a separating-chamber, having passages in its periphery and an inwardly-curved portion at one end, of a central shaft, a discharger secured on the said shaft beyond the said curved portion and operating to draw the straw out of the chamber, and bars supported on the said shaft under the said curved portion and operating to whirl around the straw in the said chamber, substantially as set forth.

9. The combination, with a separating-chamber provided with an opening at its top, and means for whirling around the straw in the said chamber; of a discharger-casing provided with a conical throat-piece secured over the said opening, and a revoluble discharger provided with arms having downwardly-projecting portions revolving in the said throat-piece, substantially as set forth.

10. The combination, with a threshing-cylinder, its shaft, and bars projecting longitudinally beyond one end of the cylinder; of a separating-chamber provided with spiral ribs, passages between the ribs, and an inwardly-curved portion over the upper ends of the said bars; and a centrifugal straw-discharger secured on the said shaft above the said chamber, substantially as set forth.

11. In a threshing-machine, the combination, of the cylinder mounted on a vertical shaft, a surrounding casing having a concave set in one side thereof and extending above said cylinder to form a separating-chamber, means for whirling the straw therein, and a pneumatic discharger connected with the top thereof, substantially as set forth.

12. In a threshing-machine, the combination, of the cylinder, a surrounding chamber, a concave, a separating-chamber above said cylinder, arms extending from said cylinder up into said chamber, and a pneumatic discharger connected with the top thereof, substantially as set forth.

13. In a threshing-machine, the combination, of a vertical casing, a threshing and separating chamber within said casing, one directly above the other, the threshing-cylinder mounted vertically in said threshing-chamber, means for imparting centrifugal action mounted in the separating-chamber, and means for conveying the straw from one through the other, and discharging it, substantially as set forth.

14. In a threshing-machine, the combination with the threshing mechanism, of a separator consisting of a vertical cylindrical casing, means for imparting centrifugal motion to its contents and inclined or spiral flights on its sides, whereby as said contents is whirled it is also conveyed toward the discharger, substantially as set forth.

15. In a threshing-machine, the combination, of the threshing mechanism, and the separating mechanism mounted one above the other in vertical relation, the casing of said separating mechanism being vertical and perforated, means therein for whirling around its contents, conveying forms around its periphery, and a discharger, substantially as set forth.

16. In a separator for threshing-machines, the combination of the vertical shaft, the cylinder, the concave, the separating-chamber, a grain-receiving trough beneath, and a scraper mounted on said shaft and arranged to travel in said trough, whereby the grain is carried around to the discharger-spout, substantially as set forth.

17. In a separator for threshing-machines, the combination, of the vertical shaft, the threshing mechanism, the separating-chamber, the circular grain-receiving trough below the edge of said chamber, and an arm carrying a scraper mounted on said shaft, said scraper being arranged to travel in said trough, substantially as set forth.

In testimony whereof I affix my signature in presence of two witnesses.

FRANK F. LANDIS.

Witnesses:

F. C. CUNNINGHAM,

T. S. CUNNINGHAM.